United States Patent [19]

Balik

[11] Patent Number: 5,083,750
[45] Date of Patent: Jan. 28, 1992

[54] MEMBRANE VALVE

[75] Inventor: Kurt Balik, Vienna, Austria

[73] Assignee: Balik Gesellschaft m.b.H., Vienna, Austria

[21] Appl. No.: 702,902

[22] Filed: May 17, 1991

[30] Foreign Application Priority Data

May 17, 1990 [AU] Australia .................................. 1097/90

[51] Int. Cl.⁵ .......................................... F16K 31/00
[52] U.S. Cl. ................................. 251/335.2; 251/186
[58] Field of Search ................ 251/176, 186, 335.1, 251/335.2

[56] References Cited

U.S. PATENT DOCUMENTS 978,288 12/1910 Harkom ......................... 251/335.2
3,211,419 10/1965 Klinger-Lohr ...................... 251/186

FOREIGN PATENT DOCUMENTS 616251 7/1935 Fed. Rep. of Germany ... 251/335.2
1417343 12/1975 United Kingdom ............. 251/335.2

*Primary Examiner*—A. Michael Chambers
*Attorney, Agent, or Firm*—Herbert Dubno

[57] ABSTRACT

A membrane valve having a metal membrane bent smoothly axially at its inner and outer peripheries and welded steplessly, smoothly and flush to an outer ring clamped between two housing parts and a valve member which can be a cone in metal-to-metal engagement with a valve seat, thereby maintaining aseptic conditions without locations in which bacteria can nest.

8 Claims, 3 Drawing Sheets

MEMBRANE VALVE

FIELD OF THE INVENTION

My present invention relates to a membrane valve and more particularly, to a valve suitable for use in aseptic conditions, i.e. a valve having a metallic valve seal member connected by a membrane to the housing and pressed by a spindle, a stem or the like against a valve seat.

BACKGROUND OF THE INVENTION

Membrane valves, which are particularly advantageous in biotechnology, the food industry and the pharmaceutical industry where aseptic conditions must be maintained, are also known as aseptic valves since they can maintain aseptic conditions in the fluid compartment of the valve which is separated from the actuator compartment by a membrane.

In many conventional membrane valves, the membrane is composed of natural rubber or a synthetic elastomer. With such materials, in use, relatively soon small cracks can arise in the membrane which can be populated by bacteria. Such valves, while they may continue to retain their sealing function, nevertheless become unsuitable for aseptic systems.

Aseptic valves of the bellows-valve type have also been proposed, the valve bellows being composed of stainless steel. Between the ribs or corrugations of the bellows, however, contaminants can readily accumulate and the useful life of the bellows is therefore quite limited. When efforts are made to coat the metal bellows with synthetic resin materials, such as polytetrafluoroethylene, however, the same problems arise as have been described in conjunction with elastomer membranes.

U.S. Pat. Nos. 4,671,490 and 4,750,709 describe membrane valves of the type first mentioned above and in which a welding of the membranes is affected to hold the layers of the membrane together. To anchor the membrane to the membrane ring and sealing member, however, clamping systems are used and/or clamping systems are provided to relieve the weld locations from stresses arising with the actuation of the valves. As a consequence, associated with the membranes are steps, discontinuities and crevices, especially at the clamping locations, at which bacteria can accumulate.

OBJECTS OF THE INVENTION

It is the principal object of the present invention to provide a membrane valve which is free from the drawbacks described above.

Still another object of the invention is to provide a membrane valve, especially for aseptic systems, which has a minimum of product-contacting surface area at which bacteria can accumulate.

It is another object of the invention to minimize, in a membrane valve, the nesting of bacteria in the product-contacting or aseptic portion of the valve.

SUMMARY OF THE INVENTION

These objects and others which will become apparent hereinafter are attained, in accordance with the invention in a membrane valve in which the membrane is composed of metal, is welded at its outer periphery to the membrane ring, is welded at its inner periphery to the metal valve member, and is bent smoothly at its inner or outer peripheries in directions which extended parallel to the axis of the membrane in a stepless manner and such that the membrane is welded steplessly with the membrane ring and sealing member. No step, crevice or gap is formed in the membranes itself because of the small curvatures throughout from inner edge to outer edge, and no step is formed between the membrane and either the inner member or the outer ring.

In the membrane valve of the invention, the product contact metal surfaces of the membrane, the valve sealing member and the ring are smooth and the transitions are smooth and flush so that there is no place for bacteria to nest. The useful life of such a valve is thereby greatly increased by comparison with earlier valve systems.

More specifically, a membrane valve of the invention comprises:

a valve housing;

means for defining an inlet port, an outlet port and a valve seat between the inlet port and the outlet port;

a membrane ring secured in the valve housing;

a metal membrane surrounding an axis flush and steplessly welded to the ring at an outer periphery of the membrane and having an inner periphery, the inner and outer peripheries being smoothly bent from an annular central region of the membrane transverse to the axis in continuous stepless curves into directions along the axis;

a valve seal member flush and steplessly welded to the inner periphery and engageable with the seat; and actuating means including a stem movable in the housing and acting upon the membrane for displacing the membrane and the valve seal member.

According to a feature of the invention the valve seal member is a metal seal cone forming a metal to metal seal with the valve seat and welded directly to the membrane.

So that stresses on the metal membrane are held especially small, the ring to which the membrane is welded at its outer periphery can be clamped between upper and lower parts of the valve housing. A simple construction of the valve of the invention can be achieved by forming the lower part as a substantially planar plate.

BRIEF DESCRIPTION OF THE DRAWINGS

The above and other objects, features and advantages of my invention will become more readily apparent from the following description, reference being made to the accompanying highly diagrammatic drawing in which.

SPECIFIC DESCRIPTION

Figure 1:
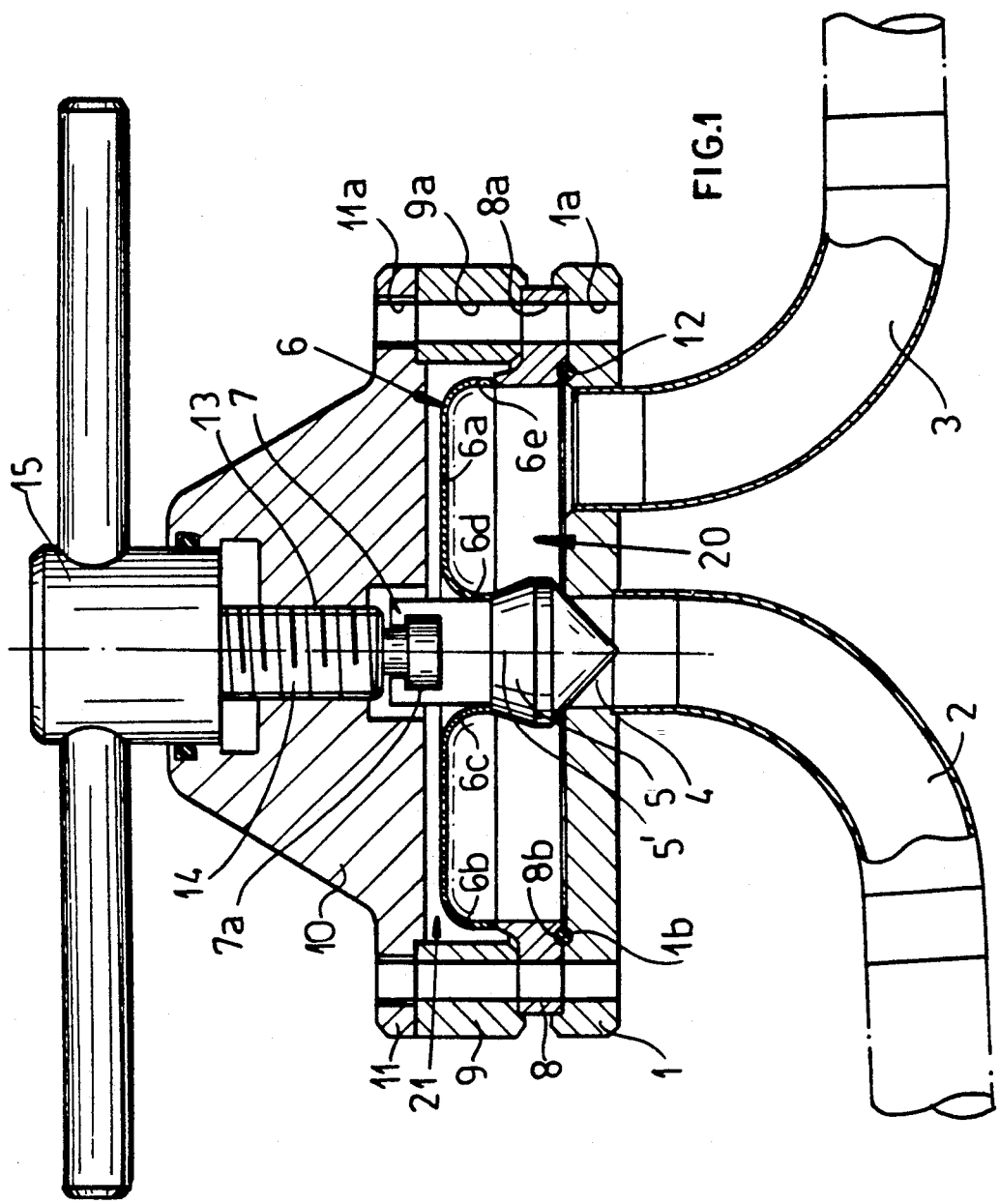
FIG. 1 is a cross sectional view through a membrane valve according to the invention.

As can be seen from FIG. 1, a valve housing is formed by a plate 1 defining the lower housing part and having ports to which the pipe elbows 2 and 3 are connected for supplying and carrying off the fluid controlled by the valve in an aseptic manner. The bore or port 4 at which the elbow 2 is connected also forms a metal valve seat for a conical sealing member 5 having an upwardly extending post 7 passing through a metal membrane 6 whose central portion 6a extends perpendicular to the axis 5' of the sealing member and whose peripheral portions 6b and 6c are bent to extend along the axis in a stepless manner. The peripheral edges are welded at 6d and 6e to the valve member 5 and a ring 8 also in a stepless manner.

The bottom portion 1 of the housing, the sealing member 5, the membrane 6 and the ring 8 are all composed of stainless steel.

The ring 8 is clamped between the plate 1, which forms a flange, and an intermediate flange 9 of the upper housing part 10 having an outwardly flanged portion 11 via bolts, not shown, passing through bores 11a in the flange 11, bores 9a in the flange 9, bores 8a in the ring 8 and bores 1a in the plate 1.

The plate 1 is formed with an annular groove 1b which registers with a groove 8b in the ring 8 so that these grooves can accommodate and compress between them a static teflonized elastomer gasket 12.

The upper part 10 of the valve housing is formed with a screwthread 13 in which a valve spindle 14 is threaded. A handle 156 can be connected to this valve spindle to permit that valve to be opened and closed. A hammerhead formation 16 at the lower end of the spindle 14 (FIG. 2) is engaged in a recess 7a formed in the post 7 and opening into a compartment 7b thereof. By rotation of the spindle 14, the sealing member 5 can be lifted from the valve seat or pressed thereagainst. The membrane 6 moves along with the valve member 5 but fully seals the aseptic portion 20 of the valve from the actuating compartment 21.

Figure 2:
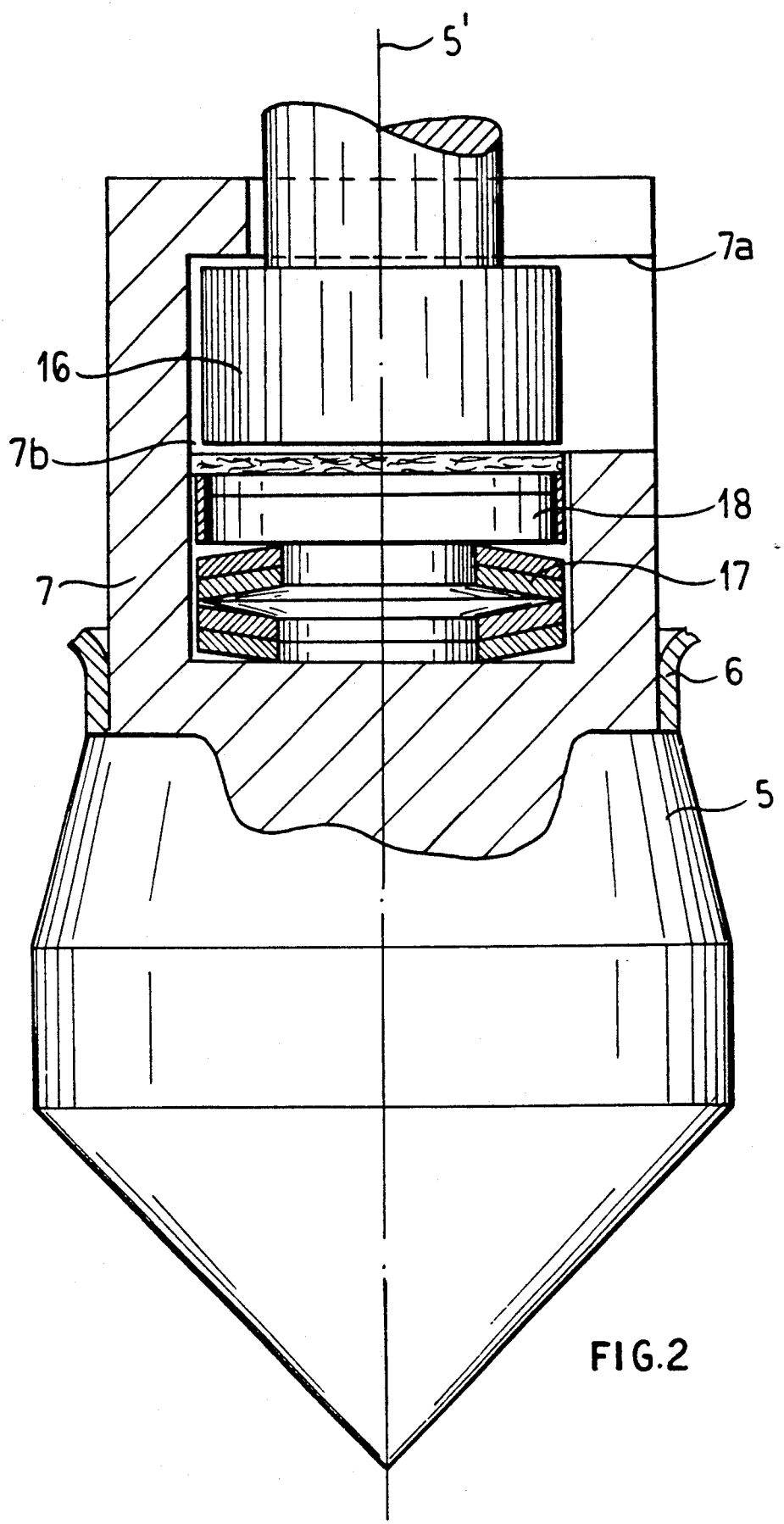
FIG. 2 is a detail view of the sealing cone welded to the inner periphery of the membrane.
Figure 3:
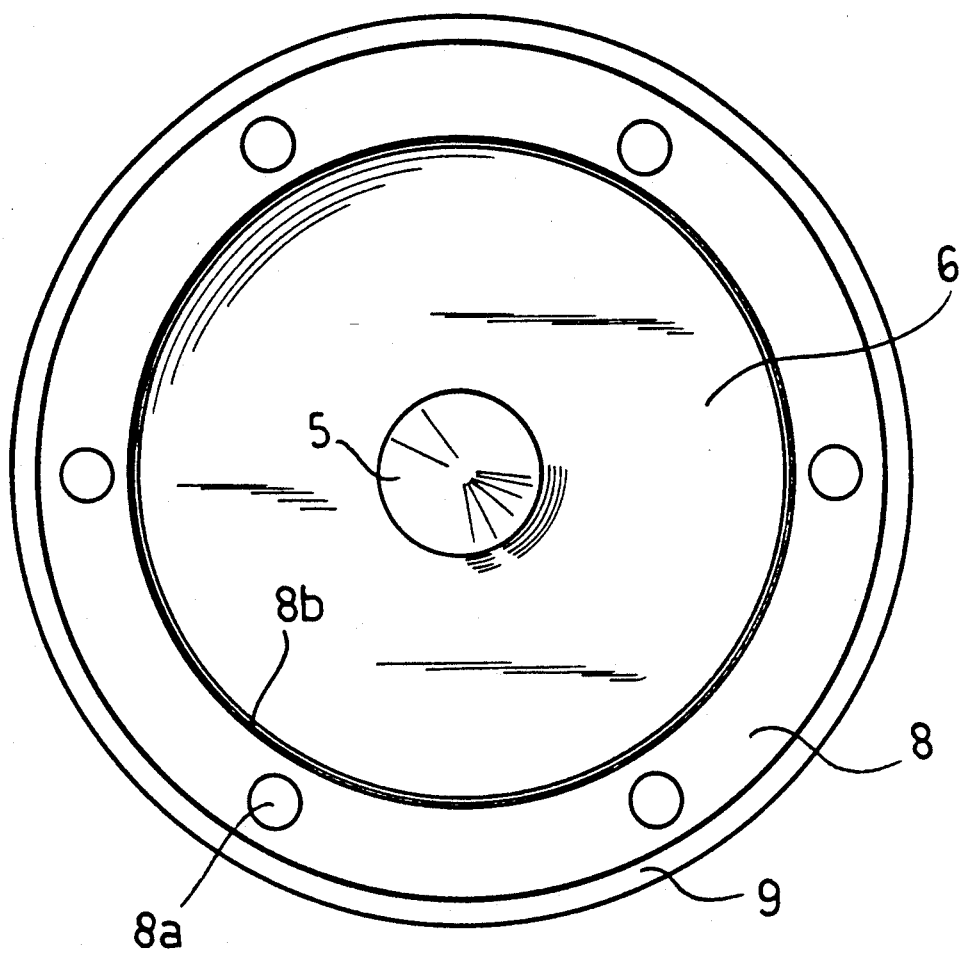
FIG. 3 is a bottom view of the valve taken above the lower housing part.

As is apparent form the drawing, all of the product-contacting surfaces of the bottom part 1 of the valve, the sealing body 5, the membrane 6 and the ring 8 are completely smooth to exclude bacteria nesting sites. 20 From the enlargement of the sealing member 5 seen in FIG. 2, it will be apparent that the compartment 7b contains dished-disk or plate springs 17, i.e. a stack of belleville washers and an intervening washer 18 to take up length changes resulting from wear and thermal expansion or contraction. The spring 17 can be compressed when the valve is closed.

The device illustrated admits of various modifications within the scope of the appended claims and, for example, the threaded spindle can be replaced by a pneumatic or electric actuator or a manually operated ram or plunger and/or the cone 5 can be replaced by a ball.

I claim:

1. A membrane valve, comprising:
   a valve housing;
   means for defining an inlet port, an outlet port and a valve seat between said inlet port and said outlet port;
   a membrane ring secured in said valve housing;
   a metal membrane surrounding an axis flush and steplessly welded to said ring at an outer periphery of said membrane and having an inner periphery, said inner and outer peripheries being smoothly bent from an annular central region of said membrane transverse to said axis in continuous stepless curves into directions along said axis;
   a valve seal member flush and steplessly welded to said inner periphery and engageable with said seat; and
   actuating means including a stem movable in said housing and acting upon said membrane for displacing said membrane and said valve seal member.

2. The membrane valve defined in claim 1 wherein said valve seal member and said seat form a metal-to-metal seal between them and said member has sealing cone engageable in said seat.

3. The membrane valve defined in claim 1 wherein said housing is formed With an upper part provided with said actuating means and a lower part provided with said ports and said seat, said membrane ring being clamped between said parts.

4. The membrane valve defined in claim 3 wherein said lower part is a substantially planar plate.

5. The membrane valve defined in claim 4, further comprising an annular gasket received in aligned annular grooves of said membrane ring and said plate.

6. The membrane valve defined in claim 5 wherein said membrane is composed of stainless steel.

7. The membrane valve defined in claim 6, further comprising a spring between said stem and said valve seal member.

8. The membrane valve defined in claim 7 wherein said member is formed with a post formed with a compartment and said stem has a head received in said compartment, said spring being a stack of belleville washers in said compartment compressible by said head.

* * * * *